(12) United States Patent
Hass et al.

(10) Patent No.: US 9,873,107 B2
(45) Date of Patent: Jan. 23, 2018

(54) PROCESS FOR THE PRODUCTION OF A CARBON SUPPORTED CATALYST

(71) Applicant: BASF SE, Ludwigshafen (DE)

(72) Inventors: Andreas Hass, Mannheim (DE); Ekkehard Schwab, Neustadt (DE); Franz Weber, Eppelheim (DE); Nicole Becker, Böhl-Iggelheim (DE)

(73) Assignee: BASF SE (DE)

( * ) Notice: Subject to any disclaimer, the term of this patent is extended or adjusted under 35 U.S.C. 154(b) by 0 days.

(21) Appl. No.: 15/126,801

(22) PCT Filed: Mar. 17, 2015

(86) PCT No.: PCT/IB2015/051948
§ 371 (c)(1),
(2) Date: Sep. 16, 2016

(87) PCT Pub. No.: WO2015/140712
PCT Pub. Date: Sep. 24, 2015

(65) Prior Publication Data
US 2017/0100706 A1   Apr. 13, 2017

(30) Foreign Application Priority Data
Mar. 18, 2014   (EP) .................................... 14160516

(51) Int. Cl.
*B01J 21/18*   (2006.01)
*B01J 23/648*   (2006.01)
(Continued)

(52) U.S. Cl.
CPC ........... *B01J 21/18* (2013.01); *B01J 23/6484* (2013.01); *B01J 35/0013* (2013.01);
(Continued)

(58) Field of Classification Search
CPC ... B01J 21/18; B01J 23/63; B01J 23/64; B01J 23/648; B01J 23/6482; B01J 23/6484;
(Continued)

(56) References Cited

U.S. PATENT DOCUMENTS 6,660,680 B1 * 12/2003 Hampden-Smith ...... B01J 2/003
257/E21.304
7,485,390 B2 * 2/2009 Devenney ............ B01J 19/0046
429/524
(Continued)

FOREIGN PATENT DOCUMENTS

WO   WO-2005106995 A1   11/2005
WO   WO-2007114525 A1   10/2007
(Continued)

OTHER PUBLICATIONS

Camacho, B.R., et al., "Enhancing oxygen reduction reaction activity and stability of platinum via oxide-carbon composites", Catalysis Today, 2013, vol. 202, pp. 36-43.
(Continued)

*Primary Examiner* — Patricia L. Hailey
(74) *Attorney, Agent, or Firm* — Drinker Biddle & Reath LLP

(57) ABSTRACT

A process for the production of a carbon supported catalyst, which comprises the following steps:
(a) precipitation of at least one metal oxide onto a surface of a carbon-comprising support by preparing an initial mixture, comprising the carbon-comprising support, at least one metal oxide precursor and an organic solvent, and spray-drying of the initial mixture to obtain an intermediate product,
(b) loading of noble-metal-comprising particles onto the surface of the intermediate product in a liquid medium by deposition, precipitation and/or reduction of a noble-metal-comprising precursor with a reducing agent, (Continued)

(c) heat treatment of the catalyst precursor resulting from step (b) at a temperature higher than 400° C.

16 Claims, 19 Drawing Sheets

(51) Int. Cl.
| | | |
|---|---|---|
| *B01J 35/00* | (2006.01) | |
| *B01J 37/03* | (2006.01) | |
| *B01J 37/02* | (2006.01) | |
| *B01J 37/08* | (2006.01) | |
| *B01J 35/10* | (2006.01) | |
| *B01J 37/00* | (2006.01) | |

(52) U.S. Cl.
CPC ....... *B01J 35/1019* (2013.01); *B01J 35/1023* (2013.01); *B01J 37/0045* (2013.01); *B01J 37/0221* (2013.01); *B01J 37/035* (2013.01); *B01J 37/08* (2013.01)

(58) Field of Classification Search
CPC ........................ B01J 23/6486; B01J 23/6522; B01J 23/6525; B01J 23/6527; B01J 23/8913; B01J 23/892; B01J 23/8926; B01J 23/52; B01J 35/023; B01J 37/0045; B01J 37/0221; B01J 37/035; B01J 37/08
USPC .................................................. 502/182, 185
See application file for complete search history.

(56) References Cited

U.S. PATENT DOCUMENTS

| | | |
|---|---|---|
| 7,569,509 B2 | 8/2009 | Oonuma |
| 7,910,512 B2 | 3/2011 | Takahashi et al. |
| 2010/0068591 A1 | 3/2010 | Kawamura |
| 2010/0210454 A1* | 8/2010 | Epshteyn ................. B01J 21/18 502/185 |
| 2012/0024757 A1 | 2/2012 | Xia et al. |
| 2013/0164655 A1 | 6/2013 | Kremliakova |

FOREIGN PATENT DOCUMENTS

| | | |
|---|---|---|
| WO | WO-2011038907 A2 | 4/2011 |
| WO | WO-2012143131 A1 | 10/2012 |
| WO | 2015/140712 * | 9/2015 .............. B01J 21/18 |

OTHER PUBLICATIONS

Landau, M. V., et al., "Handbook of Heterogeneous Catalysis", 2009, vol. 1, 2nd Ed., pp. 119-160.
Özer, N., et al., "Preperation and properties of spin-coated Nb2O5 films by the sol-gel process for electronic applications", Thin Solid Films, 1996, vol. 277, pp. 162-168.
Sasaki, K., et al., "Alternative Electrocatalyst Support Materials for Polymer Electrolyte Fuel Cells", ECS Trans., 2010, vol. 33, pp. 473-482.
Vioux, A., "Nonhydrolytic Sol-Gel Routes to Oxides", Chemistry of Materials, 1997, vol. 9, pp. 2292-2299.
International Search Report for PCT/IB2015/051948 dated Jul. 22, 2015.
Written Opinion of the International Searching Authority for PCT/IB2015/051948 dated Jul. 22, 2015.
Written Opinion and International Preliminary Report on Patentability for PCT/IB2015/051948 dated Sep. 20, 2016.

* cited by examiner

PROCESS FOR THE PRODUCTION OF A CARBON SUPPORTED CATALYST

CROSS-REFERENCE TO RELATED APPLICATIONS

This application is a national stage application (under 35 U.S.C. §371) of PCT/IB2015/051948, filed Mar. 17, 2015, which claims benefit of European Application No. 14160516.2, filed Mar. 18, 2014, both of which are incorporated herein by reference in their entirety.

The invention relates to a process for the production of a carbon supported catalyst, which comprises precipitation of a metal oxide, spray-drying, loading of a noble metal comprising compound and heat treatment.

Carbon supported catalysts are for example applied in proton exchange membrane fuel cells (PEMFC). PEMFCs are applied for an efficient conversion of stored chemical energy to electric energy. It is expected that future applications of PEMFCs are in particular mobile applications. For electrocatalysts, typically carbon supported platinum nanoparticles are used. These systems still require improvement concerning the activity and stability.

Under reaction conditions, which are predominant in PEMFCs, the catalyst underlies various deactivation mechanisms. Especially, the cathode of the PEMFC is affected. For example, platinum can be dissolved and re-deposited in different positions on the catalyst or on a membrane present in the PEMFC. Due to the deposition onto other platinum particles, the diameter of the particles increases. This results in a reduced number of accessible metal atoms of the catalytically active platinum and therefore, in a reduced activity of the catalyst.

It is known that deactivation of such electrocatalysts can be reduced by addition of a third component to the support and platinum. Stabilizing effects were shown for metal oxides like $TiO_2$ and $SnO_2$ for example in B. R. Camacho, Catalysis Today 220 (2013), pages 36 to 43.

In order to enable a strong interaction of the metal oxide with the platinum, a specialized process of platinum deposition is required. Further, such metal oxides have to be stable under acid conditions, which are predominant in PEMFCs.

According to an overview from K. Sasaki et al., ECS Trans. 33 (2010), pages 473 to 482, it is expected that among others $Nb_2O_5$, $TiO_2$ and $SnO_2$ are stable for the desired applications.

In document US 2013/164655 A1, a catalyst is described, which comprises an alloy or an intermetallic composition of platinum and a second metal and an oxide of the second metal as well as a carbon-comprising support. As for the second metal, niobium, tantalum, vanadium and molybdenum are mentioned. According to X-ray diffraction measurements no crystalline constituents are comprised apart from a platinum or $Pt_2Nb$ phase. Advantages of the catalyst described in US 2013/164655 A1 in comparison to a catalyst comprising only platinum and carbon are a high activity, referring to the comprised mass of platinum, for the oxygen reduction reaction as well as a high stability in a potential range between 0.1 V and 1 V. For a loading of the carbon-comprising support with niobium oxide, a sol-gel process is applied. Amorphous $Nb_2O_5$ is formed by a heat treatment of a catalyst precursor at 400° C. in an argon atmosphere. The catalyst precursor comprising niobium oxide is subsequently loaded with 30% by weight platinum applying platinum(II) acetylacetonate as a platinum precursor compound. In an alternative procedure described in US 2013/164655 A1, a niobium oxide precursor and a platinum precursor are deposited simultaneously on the carbon-comprising support by means of a sol-gel process. In order to influence the hydrolysis velocity, a strong acid is added.

For the deposition of niobium oxide onto carbon-comprising supports, different methods are known. To be mentioned as an example is a loading of a substrate with a sol process or a loading of a substrate with a sol-gel process as described in Landau et al., in: "Handbook of Heterogeneous Catalysis" $2^{nd}$ Ed., G. Ertl, H. Knözinger, F. Schüth, J. Weitkamp (Eds.), 2009, pages 119 to 160. According to the International Union of Pure and Applied Chemistry (IUPAC), a sol-gel process is understood to be a process through which a network is formed from solution by a progressive change of liquid precursors into a sol, to a gel and in most cases, finally to a dry network.

In Landau et al., it is described that gel formation generally occurs by hydrolysis and condensation of corresponding hydrolysable metal compositions by water. Condensation in absence of water is only possible when two different metal compositions are present, as for example an alcoholate and an acetate as disclosed in Vioux et al., Chemistry of Materials 9 (1997), pages 2292 to 2299. In presence of only a metal alcoholate and an acid, but without any addition of water, no condensation of the metal composition is expected, but rather the formation of an ester from the alcoholate and the acid.

N. Özer et al., in Thin Solid Films 227 (1996), pages 162 to 168, describes that a time required for gel formation from niobium ethanolate is often several days, in presence of small amounts of acetic acid even 52 days. The aging is an important step in sol-gel processes as sol particles are cross-linked to polymeric structures.

Document WO 2011/038907 A2 describes a catalyst composition comprising an intermetallic phase comprising platinum and a metal selected from either niobium or tantalum, and a dioxide of the metal. For the production of the catalyst, the mixture of the metal, a platinum compound and a basic salt, is prepared.

In document US 2010/0068591 A1, a fuel cell catalyst is disclosed comprising an oxide of niobium ($Nb_2O_5$) and/or an oxide of tantalum ($Ta_2O_5$) supported on a conductive material. The catalyst is prepared by mixing a suspension of carbon supported platinum with niobium chloride and a reducing agent. The suspension was dried at 80° C. for six hours.

Disadvantages of the processes known in the state of the art are a non-uniform or non-homogeneous distribution of the metallic compounds on the surface of the carbon-comprising support, a limited stability of the catalyst, long residence times due to sol-gel processes, which are a cost factor in large-scale productions, and therefore, limited space-time-yields. A continuous process for the preparation of an electrocatalyst comprising a carbon-comprising support with the desired properties regarding activity and stability is not described.

It is an object of the invention to provide a process for the production of a carbon supported catalyst, which provides a uniform distribution of the metal oxide on the carbon-comprising support leading to a high specific activity and stability. Due to the uniform distribution of the metal oxide on the carbon-comprising support, a large contact area between the metal oxide and the noble metal should be provided. Further the process should offer economic advantages in terms of high space-time-yields due to low residence times. Further, the usage of only non-flammable gas in the heat treatment as well as the operation of the production process in a continuous mode should be possible.

These objects are achieved by a process for the production of a carbon supported catalyst, which comprises the following steps:

(a) precipitation of at least one metal oxide onto a surface of a carbon-comprising support by preparing an initial mixture, comprising the carbon-comprising support, at least one metal oxide precursor and an organic solvent, and spray-drying of the initial mixture to obtain an intermediate product, (b) loading of noble-metal-comprising particles onto the surface of the intermediate product in a liquid medium by deposition, precipitation and/or reduction of a noble-metal-comprising precursor with a reducing agent, (c) heat treatment of the catalyst precursor resulting from step (b) at a temperature higher than 400° C.

Figure 1:
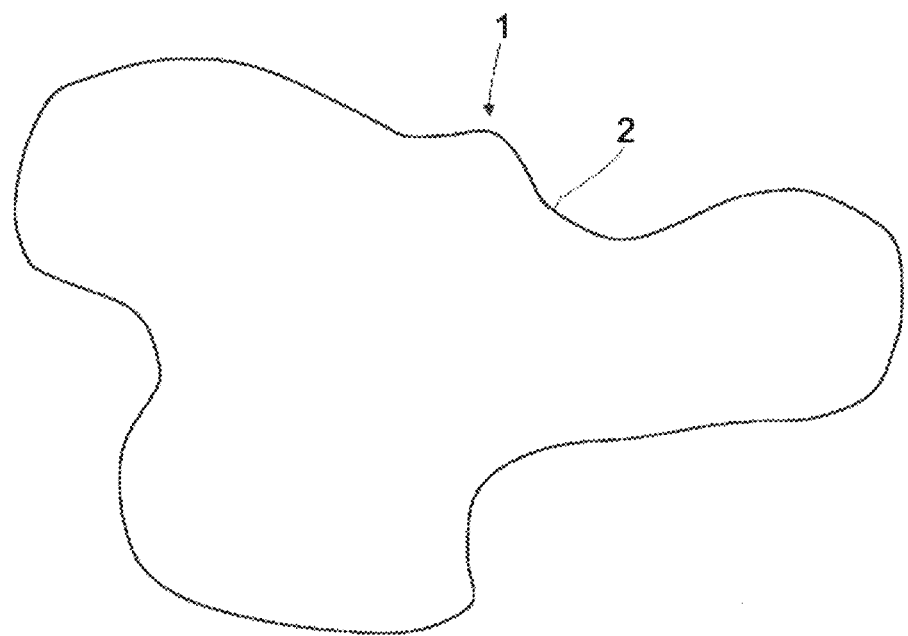
FIG. 1 shows a particle of an untreated carbon-comprising support.

In a first step (a) the surface of the carbon-comprising support is loaded with the at least one metal oxide by means of spray-drying. The initial mixture to be spray-dried comprises the carbon-comprising support, at least one metal oxide precursor, which is converted into the at least one metal oxide, and an organic solvent. The solid matter obtained from spray-drying is further processed as intermediate product, which is the carbon-comprising support loaded with the at least one metal oxide.

In a subsequent step (b) the surface of the intermediate product, which is already loaded with the at least one metal oxide, is further loaded with the noble-metal-comprising particles.

Once the surface of the carbon-comprising support is loaded with the at least one metal oxide and the noble-metal-comprising particles, which is the catalyst precursor, it is heat-treated at a temperature higher than 400° C. in a third step (c).

In a preferred embodiment the catalyst precursor is dried at a temperature lower than 400° C. before being heat-treated.

By spray-drying of the initial mixture a very homogeneous, fine and uniform distribution of the at least one metal oxide over the surface of the carbon-comprising support is achieved. In case of a homogeneous distribution of the at least one metal oxide a large interface between the at least one metal oxide and the noble-metal-comprising particles can be achieved, which leads to an intimate contact, which in turn is crucial for an effective stabilization of the noble-metal-comprising particles loaded onto the surface of the intermediate product against dissolution. The produced carbon supported catalyst shows an increased stability against electrochemical dissolution. Therefore, a re-deposition of the dissolved noble-metal-comprising particles onto other noble-metal-comprising particles on the surface of the carbon supported catalyst is reduced. This re-deposition would lead to an increased size of the loaded noble-metal-comprising particles. An increased size of the loaded noble-metal-comprising particles is disadvantageous as the specific activity referring to the mass of noble-metal is reduced. Simultaneously short residence times and high space-time yields can be realized when spray-drying is applied.

The heat treatment of step (c) stabilizes the noble-metal comprised in the carbon supported catalyst towards an electrochemical dissolution.

In a preferred embodiment, the at least one metal oxide precursor comprises niobium, titanium, tantalum, molybdenum, vanadium, tungsten, cerium, zirconium, tin, silicon or mixtures thereof. The application of at least one metal oxide precursor, which comprises niobium, is preferred.

In a further preferred embodiment, the metal oxide precursor is an alcoholate or a halide. Preferred alcoholates are ethanolates, n-propanolates, iso-propanolates, n-butanolates, iso-butanolates and tert-butanolates. Chloride is a preferred halide.

In a preferred embodiment, the organic solvent present in the initial mixture is an alcohol, a carboxylate ester, acetone or tetrahydrofuran. 2-propanol is a preferred alcohol as organic solvent in the initial mixture.

In a preferred embodiment, the initial mixture comprises less than 2%, preferably less than 1%, particularly preferably less than 0.5% and most preferably less than 0.2% by weight of water. In this embodiment, the small amounts of residual water present in the initial mixture are introduced into the initial mixture as part of at least one of the components present in the initial mixture like the organic solvent or the carbon-comprising support, which are commercially available at limited purities and which can comprise small percentages of water. A commercially available carbon-comprising support may comprise for example up to 5%, generally up to 2% and preferably up to 1% by weight of water, depending on storage conditions. In this embodiment, no additional water was added to the initial mixture or to the components added to the initial mixture.

In an alternatively preferred embodiment, the initial mixture comprises up to 20% by weight of water, preferably between 2% and 10% of water and particularly preferably between 3% and 8% by weight of water. In this alternative embodiment water is an independent and additionally added constituent of the initial mixture.

In a further preferred embodiment, the initial mixture comprises an acid. The acid is preferably a carboxylic acid. Preferably the pKa value of the acid is 3 or higher. In a particularly preferred embodiment, the acid is acetic acid. The presence of the acid in the initial mixture stabilizes the at least one metal oxide precursor in solution and an undesired solid or gel formation in the initial mixture prior to the spray-drying is avoided.

In a further preferred embodiment, the carbon-comprising support has a BET surface area of at least 500 m$^2$/g. For electrochemical applications, catalytically active materials are applied to an electrically conductive support or mixed with an electrically conductive support. In the course of the invention, the noble-metal-comprising particles comprise the catalytically active material. As support, use is preferably made of carbon, for example in the form of conductive carbon blacks, activated carbon, graphites or structured carbons such as graphenes or carbon nanotubes. Carbon supports used normally have a high specific surface area (e.g. BET surface area) which enables fine dispersion of the particles of catalytically active material as for example platinum, which are usually present as nanoparticles. The BET surface area is generally above 200 m$^2$/g and can be up to 1500 m$^2$/g.

More preferably, the BET surface of the carbon-comprising support is at least 800 m$^2$/g, most preferably at least 1000 m$^2$/g. For example, the carbon-comprising support Black Pearls® 2000 possesses a BET surface of approximately 1389 m$^2$/g.

The carbon-comprising support has to provide stability, conductivity and a high specific surface area. Conductive carbon blacks are in particular preferably used as carbon-comprising supports. Carbon blacks which are normally used are, for example, furnace black, flame black or acetylene black. Particularly preferred are furnace blacks, for example available as Black Pearls® 2000.

Nonetheless, also carbon-comprising supports, which possess a BET surface of less than 500 m$^2$/g, can be applied, for example the commercially available Vulcan XC72 with a BET surface of approximately 250 m$^2$/g.

The spray-drying of the initial mixture comprising the carbon-comprising support was found to form for example niobium oxide and hydrated niobium oxide, respectively. In an X-ray diffraction spectrum, niobium oxide became visible after crystallization by heat treatment.

In a preferred embodiment, the spray-drying is carried out by means of a two-fluid nozzle, a pressure nozzle or a centrifugal atomizer. A diameter of the nozzle of a spray-dryer with a two-fluid nozzle is preferably between 1 mm and 10 mm, particularly preferably between 1.5 mm and 5 mm and most preferably between 2 mm and 3 mm. For a two-fluid nozzle, a nozzle pressure is preferably between 1.5 bar and 10 bar absolute, particularly preferably between 2 bar and 5 bar absolute and most preferably between 3 bar and 4 bar absolute.

In a further preferred embodiment, the spray-drying is carried out with a drying gas temperature between 60° C. and 300° C., particularly preferably between 100° C. and 260° C. and most preferably between 150° C. and 220° C. The drying gas temperature is preferably selected in a way that a residue of components, which are evaporated under air at a temperature of 180° C., is present with a content of less than 30% by weight in the solid after spray-drying. An exhaust gas of the spray-dryer has a temperature in the range of preferably 50° C. to 160° C., particularly preferably between 80° C. and 120° C., most preferably between 90° C. and 110° C.

The initial mixture usually has a carbon content in the range from 1% to 30% by weight, preferably from 2% to 6% by weight.

In a further preferred embodiment, the spray-drying is carried out in a countercurrent mode with the advantage to reduce the working volume.

In a further preferred embodiment, the spray-drying is operated with a residence time referring to solid matter in a drying zone of the spray-dryer of less than 3 minutes, preferably of less than 2 minutes and particularly preferably of less than 1 minute. In laboratory scale, in which the distance between the nozzle of the spray-dryer and the apparatus for separation of the solid matter is typically not more than 1 m, the residence time is preferably shorter than 1 minute and particularly preferably less than 30 seconds. In industrial scale, the residence time is preferably shorter than 2 minutes and particularly preferred shorter than 1 minute. A short residence time offers the advantage of a high space-time yield for the process and therefore an effective production. Due to the comparably short residence times no substantial gel formation is expected. Further, a fast removal of the liquid constituents of the initial mixture supports the fine and uniform distribution of the at least one metal oxide on the surface of the carbon-comprising support. In contrast a slow removal of the liquid constituents of the initial mixture, which takes several hours, leads to a heterogeneous distribution of the at least one metal oxide on the surface of the carbon-comprising support. This might be due to a heterogeneous concentration distribution of reactants during a slow evaporation of solvents and locally increased concentrations of the at least one metal oxide precursor in the area of the gas/liquid interface.

In a further preferred embodiment, solid matter, which is the intermediate product, is separated after spray-drying by means of a cyclone. In industrial scale, a filter can be applied for this purpose, whereby the filter can be heated to constant temperatures in order to prevent condensation.

In a further preferred embodiment, the intermediate product can be grounded after spray-drying in order to provide solid particles with a mean diameter between 0.1 µm and 10 µm. The particles of the intermediate product, which are loaded with noble-metal-comprising particles, possess preferably a mean diameter between 0.1 µm and 5 µm.

In a further embodiment, after spray-drying, the intermediate product is washed with water and dried before the loading of the noble-metal-comprising particles in order to remove solvent and/or acid residues, which might interfere with the loading process of the noble-metal-comprising particles.

In a preferred embodiment, for the loading of the noble-metal-comprising particles on the surface of the intermediate product, a noble-metal-comprising compound, which is preferably platinum(II)hydroxide or platinum(IV)hydroxide, is deposited onto the surface of the intermediate product in the liquid medium, a reducing agent is added to the liquid medium and the noble-metal-comprising compound is reduced.

In an alternative preferred embodiment, the noble-metal-comprising compound is precipitated onto the surface of the intermediate product by addition of a reducing agent. The reducing agent can be chosen from various compounds as for example ethanol, formic acid, sodium formiate, ammonium formiate, ascorbic acid, 2-propanol, glucose, ethylene glycol or citric acid. In a particularly preferred embodiment, the reducing agent is an alcohol, particularly ethanol. By the precipitation of the noble-metal-comprising compound with an reducing agent a homogeneous distribution of the noble-metal-comprising particles over the surface of the carbon-comprising support is achieved as the deposition is not selectively directed to the at least one metal oxide, already present on the surface of the carbon-comprising support.

In a further alternative preferred embodiment, the noble-metal-comprising particles are loaded directly onto the surface of the intermediate product by any method known by a person skilled in the art. An example for the direct loading of noble-metal-comprising particles onto the surface of the intermediate product is the impregnation of the intermediate product with platinum(II)acetylacetonate, which is reduced by the heat treatment under a reducing atmosphere.

In a further preferred embodiment, the noble-metal-comprising precursor is a metal salt, preferably a nitrate.

In a preferred embodiment, the loaded noble-metal-comprising particles comprise platinum. Correspondingly the noble-metal comprising precursor comprises platinum. In a further preferred embodiment, the loaded noble-metal-comprising particles comprise platinum and additionally cobalt, nickel, chromium, copper, palladium, gold, ruthenium, scandium, yttrium, lanthanum, niobium or titanium.

XRD-results proved that platinum particles catalyse the reduction of Nb(V) to Nb(IV) in the presence of hydrogen at elevated temperatures.

In general, as catalytically active material for electrochemical reactions, use is frequently made of noble metals, in particular metals of the platinum group, for example platinum, palladium, ruthenium, rhodium or iridium or alloys and/or intermetallic compounds of the metals of the platinum group, and also of the copper group, for example copper, silver or gold or alloys and/or intermetallic compounds thereof. Furthermore, metals of the platinum or copper group and also transition metals such as nickel, cobalt, vanadium, iron, titanium, chromium, etc., in each case individually or in combination with one or more further metals, can be used as alloy component.

Application of the catalytically active material or the noble-metal-comprising particles onto the surface of a support or on the intermediate product can be effected by any method known to those skilled in the art. Thus, for example, the catalytically active material or the noble-metal-comprising particles can be applied by deposition from solution. For this purpose, it is possible, for example, to dissolve metal compounds comprising the catalytically active material in a solvent. The metal can be bound covalently, ionically or by complexation. Furthermore, it is also possible for the metal to be deposited reductively, as precursor or under alkaline conditions by precipitation of the corresponding hydroxide. Further possibilities for depositing the catalytically active material or the noble-metal-comprising particles are impregnation using a solution comprising the catalytically active material or noble metal (incipient wetness), chemical vapor deposition (CVD) or physical vapor deposition (PVD) and all further processes known to those skilled in the art by means of which the catalytically active material or noble-metal-comprising particles can be deposited. When a metal of the platinum group is used as catalytically active material, preference is given to reductively precipitating a salt of the metal. Precipitation and washing are followed by drying and heat treatment to produce the catalyst.

For use as cathode catalyst in fuel cells, the catalytically active material is preferably selected from among platinum and alloys and/or intermetallic compounds comprising platinum. Suitable alloying metals are, for example, nickel, cobalt, iron, vanadium, titanium, ruthenium, chromium, scandium, yttrium and copper, in particular nickel and cobalt. Suitable alloys and/or intermetallic compounds comprising platinum are, for example, selected from the group consisting of PtNi, PtFe, PtV, PtCr, PtTi, PtCu, PtPd, PtCo and PtRu. Particular preference is given to a platinum-nickel alloy, a platinum-copper alloy and/or intermetallic compound or a platinum-cobalt alloy and/or intermetallic compound, or a ternary alloy and/or intermetallic compound comprising PtNi, PtCo or PtCu. When an alloy and/or intermetallic compound is used as catalytically active material, the proportion of platinum in the alloy and/or intermetallic compound is typically in the range from 25 to 95 atom %, preferably in the range from 40 to 90 atom %, more preferably in the range from 50 to 80 atom % and in particular in the range from 60 to 80 atom %.

Apart from the alloys and/or intermetallic compounds mentioned, it is also possible to use alloys and/or intermetallic compounds which comprise more than two different metals, for example ternary alloy systems.

When the catalytically active material is applied by precipitation, it is possible to use, for example, a reductive precipitation, for example of platinum from platinum nitrate by ethanol, by means of $NH_4OOCH$ or $NaBH_4$. As an alternative, decomposition and reduction in $H_2/N_2$, for example of platinum acetylacetonate mixed with the intermediate product, is also possible. Very particular preference is given to reductive precipitation by means of ethanol. In a further embodiment, the reductive precipitation is effected by means of formate, in particular ammonium formate.

The heat treatment is preferably carried out at temperatures of at least 550° C. Temperatures of more than 600° C. are particularly preferred. Temperatures between 780° C. and 820° C. are most preferred.

In a preferred embodiment, the heat treatment in step (c) is carried out in a reducing atmosphere. Preferably less than 30% by weight and particularly preferably less than 20% by weight of hydrogen are comprised in the reducing atmosphere. In a particularly preferred embodiment, the reducing atmosphere comprises only up to 5% by volume of hydrogen. For these low hydrogen concentrations, the reducing atmosphere is a non-flammable gas mixture and investment costs for the plant construction and costs for plant operation can be reduced.

The heat treatment can be carried out in a furnace. A suitable furnace is, for example, a rotary bulb furnace. A rotary tube furnace can also be used, either in batch operation or in continuous operation. Apart from the use of the furnace, the use of a plasma or the use of a microwave operation is also possible for heating.

A use of a continuously operable furnace in combination with spray-drying in one process offers the possibility to design a continuous process for the production of the carbon supported catalyst.

In a preferred embodiment, a molar ratio of metal comprised in the at least one metal oxide precursor and carbon comprised in the carbon-comprising support in the initial mixture is between 0.00005 and 0.01, more preferably between 0.0001 and 0.005.

In a further preferred embodiment, a molar ratio of metal, originating from the at least one metal oxide precursor and comprised in the intermediate product, and the platinum comprised in the liquid medium is between 0.05 and 0.8, preferably between 0.1 and 0.8.

In an embodiment, the liquid medium, in which the noble-metal particles are loaded onto the surface of the intermediate product, comprises water. A water content in the liquid medium is preferably higher than 50% by weight, particularly preferably higher than 70% by weight. However, it is alternatively possible that the liquid medium is free of water.

The invention is further related to a carbon supported catalyst. In the inventive embodiment of the carbon supported catalyst, the carbon supported catalyst comprises between 2% by weight and 25% by weight of niobium oxide, a mass ratio of niobium comprised in the carbon supported catalyst and platinum comprised in the carbon supported catalyst is between 0.05 and 0.5, and at least 90% by number of platinum-comprising particles comprised in the carbon supported catalyst have a diameter smaller than 20 nm.

In a preferred embodiment, the carbon supported catalyst comprises between 5% and 20% by weight of niobium oxide. The mass ratio of niobium comprised in the carbon supported catalyst and platinum comprised in the carbon supported catalyst is preferably between 0.1 and 0.5. At least 90% by number of platinum-comprising particles comprised in the carbon supported catalyst have a diameter preferably smaller than 10 nm and in particular preferably smaller than 6 nm.

The carbon supported catalyst according to the invention can be used, for example, in fuel cells. The catalyst can be used both on the anode side and on the cathode side. Particularly on the cathode side, it is necessary to use active cathode catalysts which are also stable against degradation, with the stability being determined both by the stability of the support itself and by the stability of the noble-metal-comprising particles against dissolution, particle growth and particle migration, which is influenced by the interaction of noble-metal comprising particles with the support surface. As active cathode catalysts, use can be made of alloy catalysts.

The carbon supported catalyst can be used, for example, to produce electrodes which are used in electrochemical cells, for example batteries, fuel cells or electrolysis cells. A specific example is the use of the catalyst in electrodes in fuel cells, for example proton-exchange membrane fuel cells (PEMFCs), direct methanol fuel cells (DMFCs), direct ethanol fuel cells (DEFCs), etc. Fields of application of such fuel cells are local energy generation, for example for household fuel cell systems, and also mobile applications, for example in motor vehicles. Particular preference is given to use the catalyst in PEMFCs.

Further catalytic applications for the carbon supported catalyst are as cathode catalysts (both for the oxygen evolution reaction (OER) and, preferably, for the oxygen reduction reaction (ORR)) in metal air batteries, etc.

BRIEF DESCRIPTION OF THE DRAWINGS

Figure 2:
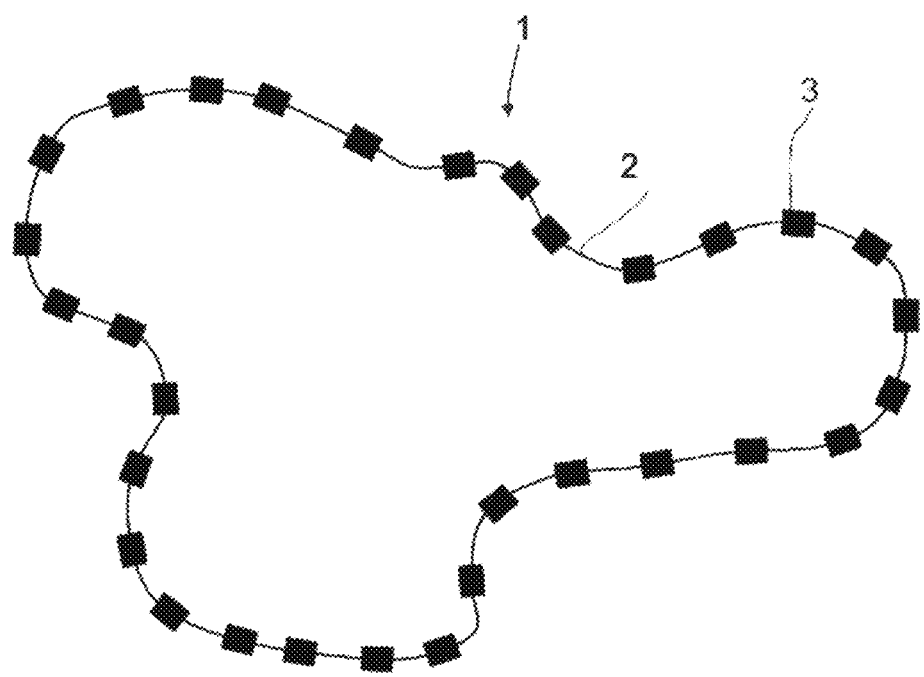
FIG. 2 shows a particle of a carbon-comprising support with at least one metal oxide on its surface and FIG. 3 shows a particle of a carbon-comprising support with at least one metal oxide and platinum nanoparticles on its surface.
Figure 3:
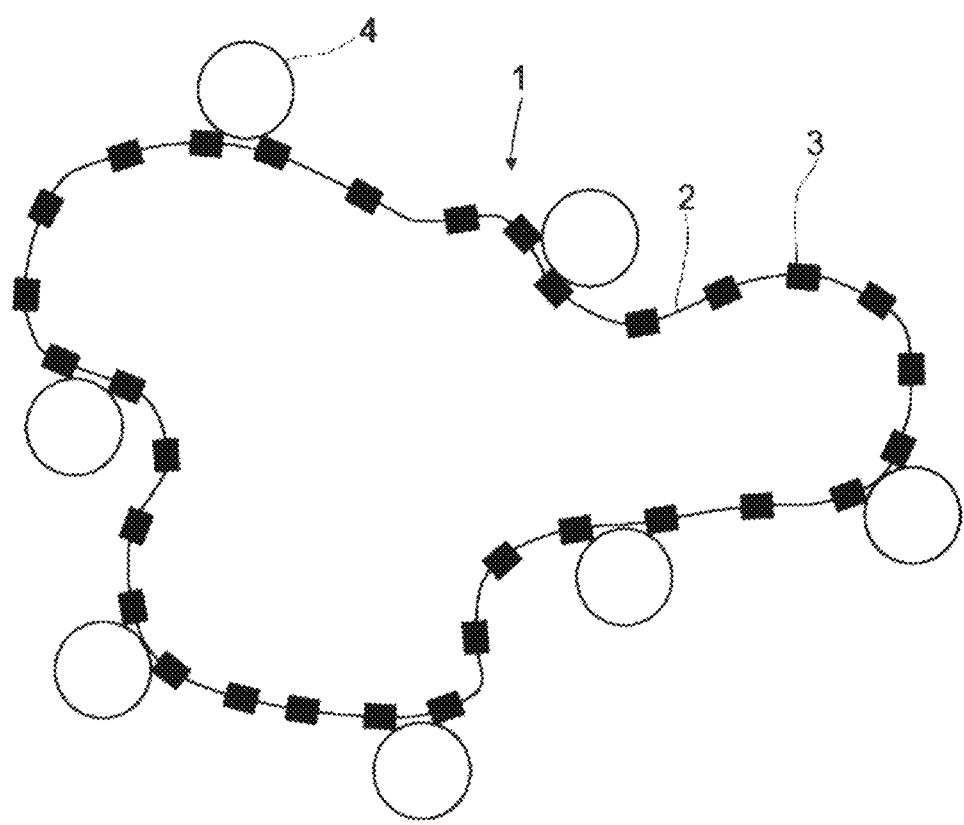

The present invention is described in more detail at hand of the accompanying drawings, in which:

FIG. 1 shows a particle of an untreated carbon-comprising support;

FIG. 2 shows a particle of a carbon-comprising support with at least one metal oxide on its surface and FIG. 3 shows a particle of a carbon-comprising support with at least one metal oxide and platinum nanoparticles on its surface.

FIG. 1 shows a particle of a carbon-comprising support 1 with a surface 2, which possesses a high specific surface area. The surface 2 is to be treated by the inventive process.

FIG. 2 shows a particle of a carbon-comprising support 1. Its surface 2 is coated with amorphous niobium oxide 3, which is uniformly and finely divided over the surface 2. The particle of the carbon-comprising support 1 shown in FIG. 2 is obtained by spray-drying.

FIG. 3 shows a particle of a carbon-comprising support 1. Platinum nanoparticles 4 are loaded onto its surface 2, which was beforehand coated with amorphous niobium oxide 3. Like the amorphous niobium oxide 3, platinum nanoparticles 4 are homogeneously deposited and uniformly and finely distributed over the surface 2. The particle of the carbon-comprising support 1, which is coated with the amorphous niobium oxide 3 and loaded with platinum nanoparticles 4, is heat-treated to form the carbon supported catalyst. During the temperature treatment under a hydrogen-comprising atmosphere, active and stabilized platinum nanoparticles 4 are formed by intimate contact with the amorphous niobium oxide 3.

EXAMPLES

I. Production Examples

Example 1

1a) Precipitation of Niobium Oxide onto Carbon by Spray-Drying

A mixture was prepared from 60 g carbon (Black Pearls® 2000, Cabot), 519 mL acetic acid with a purity of 100%, 780 mL 2-propanol with a purity of 99.7% and 88.4 mL niobium ethanolate with a purity of 99.95% based on the metal content. The mixture was dried in a spray-dryer. In order to prevent sedimentation, the mixture was agitated while being conveyed into the spray-tower. The flow rate of the mixture to be spray-dried was 609 g/h, the diameter of the nozzle of the spray-dryer was 2.3 mm, the nozzle pressure was 3.5 bar absolute, the nozzle gas was nitrogen, the volume flow of the nozzle gas was 3.5 $Nm^3/h$, the temperature of the nozzle gas was room temperature, the drying gas was nitrogen, the volume flow of the drying gas was 25 $Nm^3/h$, the temperature of the drying gas was 190 to 191° C. and the residence time in the spray-dryer was 15 seconds. For particle separation, a cyclone was applied, which is able to separate particles with a diameter of at least 10 μm. The temperature in the cyclone, corresponding to the exhaust gas temperature of the spray-dryer, was 101 to 102° C. All above-described production steps were carried out with exclusion of humidity. No extra water was added in any of the above-described production steps and the mixture to be spray-dried was prepared under nitrogen atmosphere.

An elementary analysis showed a niobium content of 12.4% by weight in the spray-dried particles. The niobium oxide was uniformly distributed on the surface of the spray-dried particles. A material loss for drying in an air stream at 180° C. was observed to be 27.5% by weight.

1 b) Deposition and Reduction of Platinum Nitrate

For deposition, 10 g of the particles obtained in example 1a) were suspended in 222 mL water by means of an ULTRA-TURRAX®. Then, a solution of 5.99 g platinum nitrate in 87 mL water was added. Under stirring, a mixture of 262 mL ethanol and 385 mL water was added and the suspension was heated to 82° C. After 6 hours at 82° C., the suspension was cooled to room temperature, filtered and the solid residue was washed with 4 L water. The resulting solid was dried in a vacuum oven at 80° C.

1c) Heat Treatment at 800° C.

5 g of the solid resulting from example 1b) was heat treated in a rotary tube furnace. In a nitrogen atmosphere, the temperature was raised by 5 Kelvin per minute to 400° C. Applying a nitrogen stream comprising 5% by volume of hydrogen, the temperature was further raised by 10 Kelvin per minute to 800° C. When a temperature of 800° C. was reached, the temperature was kept constant for one hour. Subsequently, the interior of the furnace was cooled to room temperature and at temperatures below 50° C., the gas stream was switched from the hydrogen comprising nitrogen stream to nitrogen without hydrogen. Then, the heat treated particles were passivated for 12 hours with a gas stream comprising 9% by volume air and 91% by volume nitrogen to form a carbon supported catalyst.

An elementary analysis showed a niobium content of 12% by weight and a platinum content of 33% by weight in the catalyst produced according to example 1.

Figure 4:
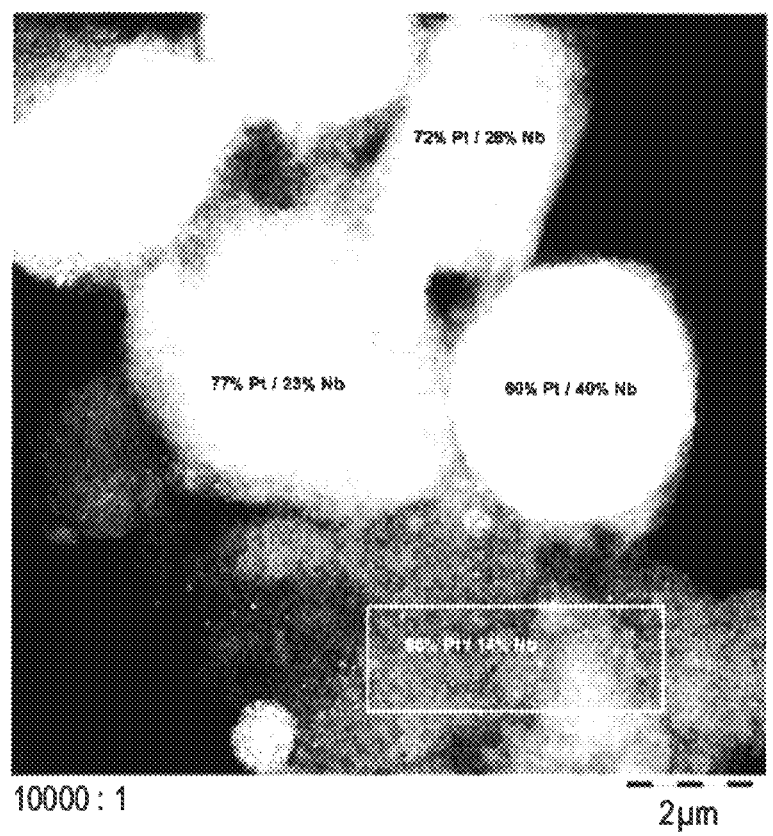
FIGS. 4 and 5 show pictures obtained by transmission electron microscopy (TEM) of the carbon supported catalyst produced in example 1.
Figure 5:
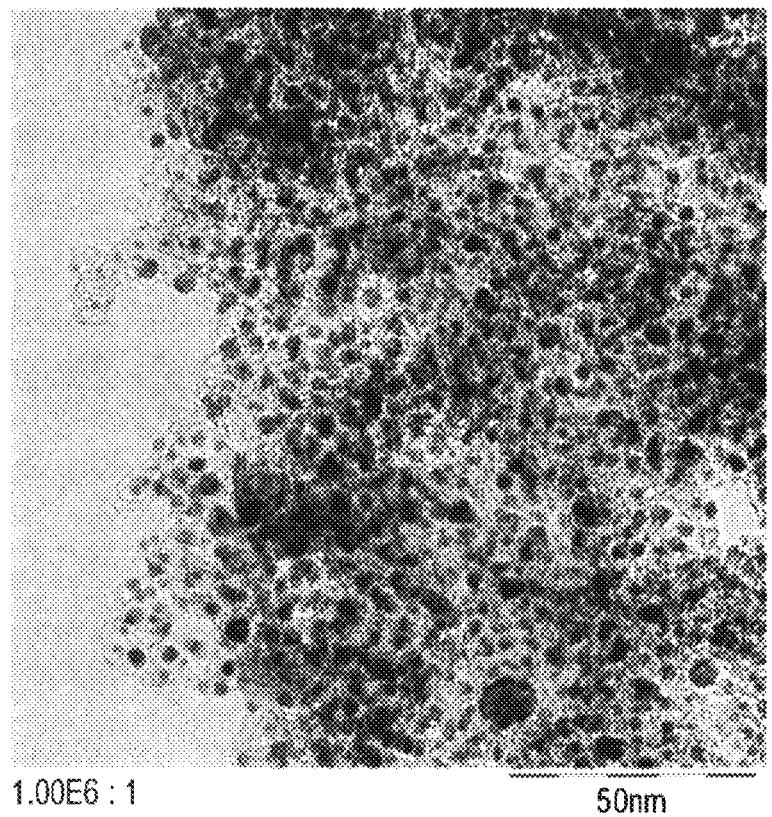

FIGS. 4 and 5 show pictures obtained by transmission electron microscopy (TEM) of the carbon supported catalyst produced in example 1. It can be seen from FIGS. 4 and 5 that the elements platinum and niobium were uniformly distributed on the surface of the catalyst. The majority of the platinum particles possessed a diameter between 1 and 5 nm. Due to the large contact area between the platinum phase and the niobium phase, a pronounced stabilizing effect was achieved. The additional data given in percent by weight in FIG. 4 resulted from a local energy dispersive X-ray spectroscopy (EDX) analysis.

Figure 6:
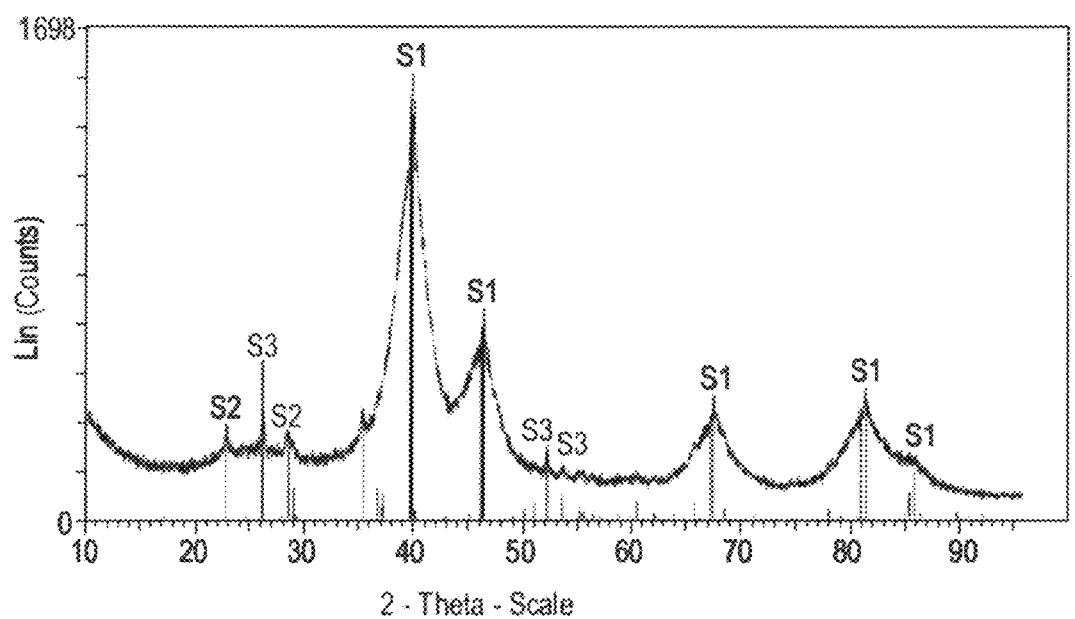
FIG. 6 shows an X-ray diffractogram of the carbon supported catalyst produced in example 1.

FIG. 6 shows an X-ray diffractogram of the carbon supported catalyst produced in example 1. The reflexes shown in FIG. 6 originate from the analysis of the sample produced in example 1. The bars represent reference reflexes, wherein S1 corresponds to a cubic platinum phase and/or a cubic $Nb_{0.2}Pt_{0.8}$ phase, S2 corresponds to an orthorhombic $Nb_2O_5$ phase and S3 corresponds to a tetragonal $NbO_2$ phase. As crystalline phases, platinum and/or an intermetallic phase or alloy comprising platinum and niobium as well as the oxides $NbO_2$ and $Nb_2O_5$ were identified for the carbon supported catalyst produced in example 1.

1d) Investigation of Gel Formation in Absence of Additional Water

A mixture consisting of 34.6 mL acetic acid, 51.9 mL 2-propanol and 5.56 mL niobium ethanolate was prepared under nitrogen atmosphere. No water was added. The gas phase over the mixture was purged with nitrogen and the mixture was stored for 69 hours at room temperature. After storage, no turbidity was observed.

Consequently, the production of a carbon supported catalyst by use of the here-above described mixture did not imply any gel formation.

Example 2

2a) Precipitation of Niobium Oxide onto Carbon by Spray-Drying

A mixture was prepared from 120 g carbon (Black Pearls® 2000, Cabot), 1038 mL acetic acid with a purity of 100%, 1560 mL 2-propanol with a purity of 99.7% and 83.4 mL niobium ethanolate with a purity of 99.95% based on the metal content. The mixture was dried in a spray-dryer. In order to prevent sedimentation, the mixture was agitated while being conveyed into the spray-tower. The flow rate of the mixture to be spray-dried was 700 g/h, the diameter of the nozzle of the spray-dryer was 2.3 mm, the nozzle pressure was 3.5 bar absolute, the nozzle gas was nitrogen, the volume flow of the nozzle gas was 3.5 $Nm^3/h$, the temperature of the nozzle gas was room temperature, the drying gas was nitrogen, the volume flow of the drying gas was 25 $Nm^3/h$, the temperature of the drying gas was 188 to 191° C. and the residence time in the spray-dryer was 15 seconds. For particle separation, a cyclone was applied, which is able to separate particles with a diameter of at least 10 μm. The temperature in the cyclone, corresponding to the exhaust gas temperature of the spray-dryer, was 101° C. to 103° C. All above-described production steps were carried out with exclusion of humidity. No extra water was added in any of the above-described production steps and the mixture to be spray-dried was prepared under nitrogen atmosphere.

An elementary analysis showed a niobium content of 10.6% by weight in the spray-dried particles. The niobium oxide was uniformly distributed on the surface of the spray-dried particles. A material loss for drying in an air stream at 180° C. was observed to be 24.0% by weight.

2b) Deposition and Reduction of Platinum Nitrate

For deposition, 20 g of the particles obtained in example 2a) were suspended in 444 mL water by means of an ULTRA-TURRAX®. Then, a solution of 12.0 g platinum nitrate in 174 mL water was added. Under stirring, a mixture of 380 mL ethanol and 524 mL water was added and the suspension was heated to 82° C. After 6 hours at 82° C., the suspension was cooled to room temperature, filtered and the solid residue was washed with 4 L water. The resulting solid was dried in a vacuum oven at 80° C.

2c) Heat Treatment at 800° C.

The solid resulting from example 2b) was separated into batches of 10.4 g, 10.5 g and 9.1 g. Each batch was heat treated separately in a rotary tube furnace. After purging with nitrogen, a flow of nitrogen comprising 5% by volume of hydrogen was applied. The temperature was raised by 10 Kelvin per minute to 800° C. When a temperature of 800° C. was reached, the temperature was kept constant for one hour. Subsequently, the interior of the furnace was cooled to room temperature and at temperatures below 50° C., the gas stream was switched from the hydrogen comprising nitrogen stream to nitrogen without hydrogen. Then, the heat treated particles were passivated for 12 hours with a gas stream comprising 9% by volume air and 91% by volume nitrogen to form a carbon supported catalyst. After this thermal treatment, the three batches were mixed.

An elementary analysis showed a niobium content of 9.6% by weight and a platinum content of 33% by weight in the catalyst produced according to example 2.

Figure 7:
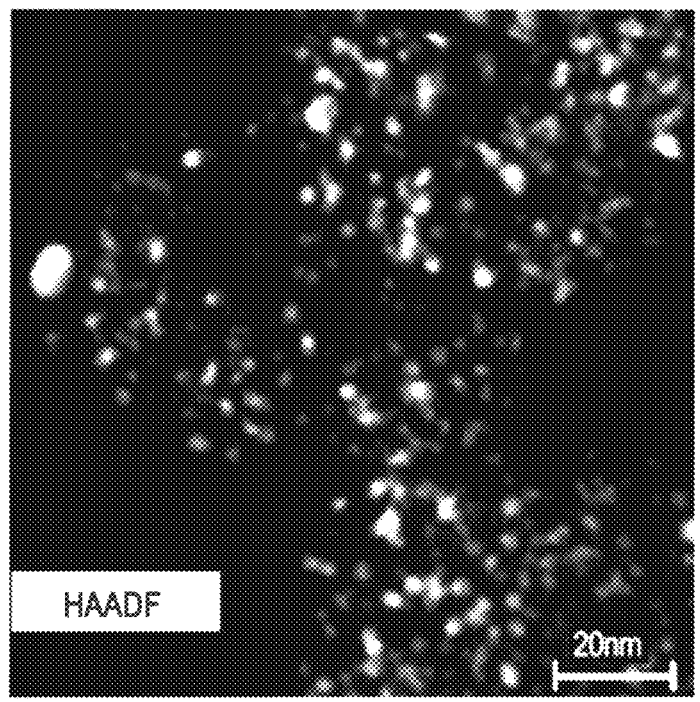
FIGS. 7, 8 and 9 show pictures obtained by transmission electron microscopy (TEM) and energy dispersive X-ray spectroscopy (EDX) analysis of the carbon supported catalyst produced in example 2.
Figure 8:
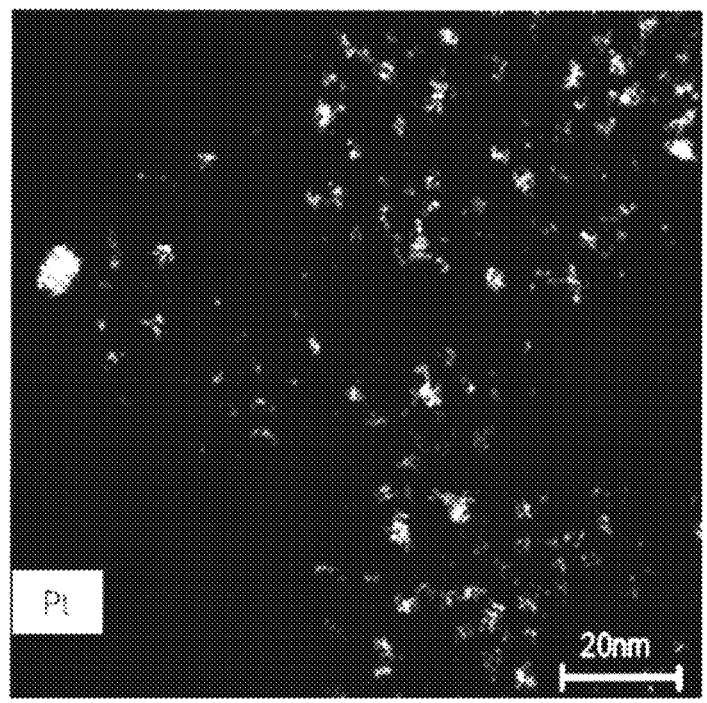
Figure 9:
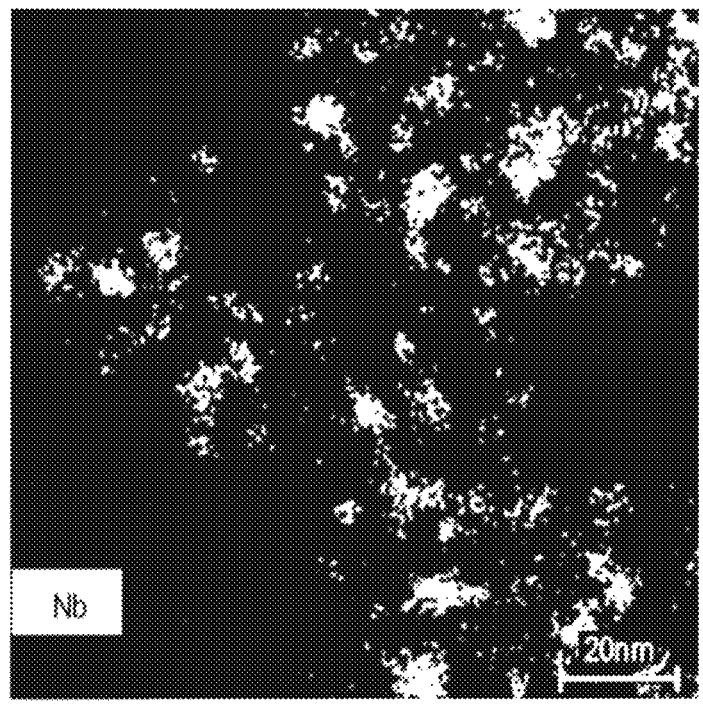

FIGS. 7, 8 and 9 show pictures obtained by transmission electron microscopy (TEM) and energy dispersive X-ray spectroscopy (EDX) analysis of the carbon supported catalyst produced in example 2. FIG. 7 shows the high angle annular dark field (HAADF), the contrast of the compounds in the sample depends on the atomic number of the element. It can be seen from FIGS. 8 and 9 that the elements platinum and niobium were uniformly distributed on the surface of the catalyst. The majority of the platinum particles possessed a diameter between 1 and 5 nm. Due to the large contact area between the platinum phase and the niobium phase, a pronounced stabilizing effect was achieved.

Figure 10:
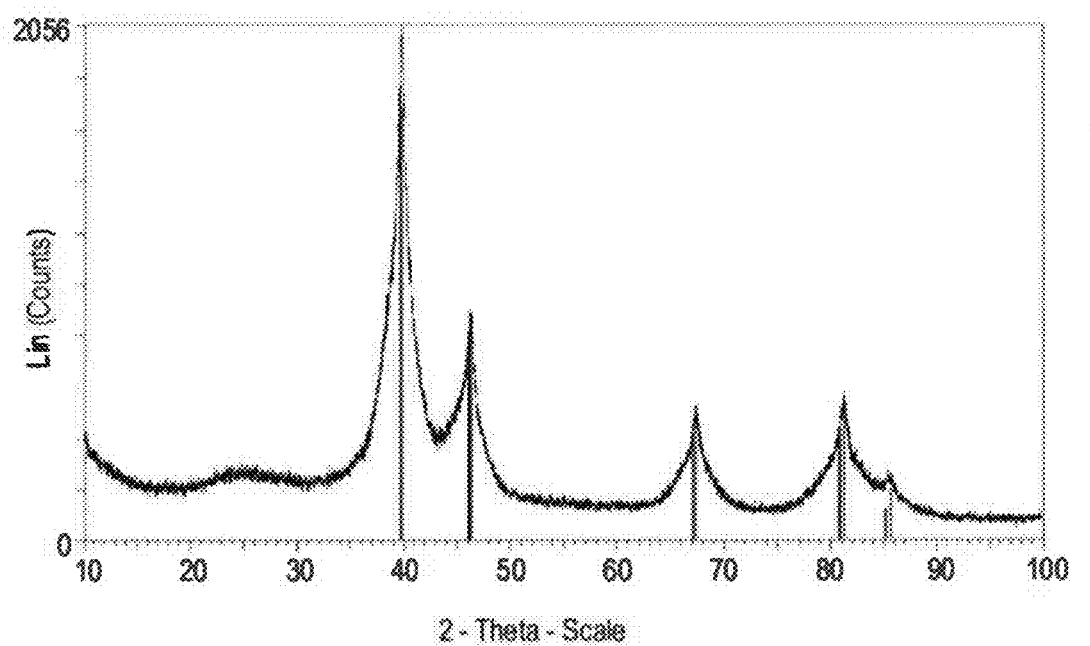
FIG. 10 shows an X-ray diffractogram of the carbon supported catalyst produced in example 3.

FIG. 10 shows an X-ray diffractogram of the carbon supported catalyst produced in example 3. The reflexes shown in FIG. 10 originate from the analysis of the sample produced in example 3. The bars represent reference reflexes corresponding to a cubic platinum phase and/or a cubic $Nb_{0.2}Pt_{0.8}$ phase. As crystalline phases, platinum and/or an intermetallic phase or alloy comprising platinum and niobium were identified for the carbon supported catalyst produced in example 2.

Example 3

3a) Precipitation of Niobium Oxide onto Carbon by Spray-Drying in Presence of Water A mixture 1 comprising 40 g carbon (Black Pearls® 2000, Cabot), 346 mL acetic acid, 520 mL 2-propanol and 55.6 mL niobium ethanolate was prepared under nitrogen atmosphere. Further, 118.6 g of a second mixture 2 consisting of 50% by weight of water and 50% by weight of 2-propanol was prepared and slowly added to mixture 1. Hereby, the ratio of the mass of mixture 2 to the volume of applied niobium ethanolate was 2.13 g/mL. The third mixture 12 comprising mixture 1 and mixture 2 was dried in a spray-dryer. In order to prevent sedimentation, the suspension was agitated while being conveyed to the spray-tower. The flow rate of the suspension to be spray-dried was 522 g/h, the diameter of the nozzle was 1.4 mm, the nozzle pressure was 3 bar absolute, the nozzle gas was nitrogen, the volume flow of the nozzle gas was 3.5 $Nm^3$/h, the temperature of the nozzle gas was room temperature, the drying gas was nitrogen, the volume flow of the drying gas was 25 $Nm^3$/h, the temperature of the drying gas was 190° C. and the residence time in the spray tower was 15 seconds. For a separation of the particles, a cyclone was applied, which is able to separate particles with a diameter of at least approximately 10 μm. The temperature in the cyclone was 114 to 116° C.

An elementary analysis of the particles resulting from example 3a) showed a niobium content of 17% by weight.

3b) Deposition and Reduction of Platinum Nitrate 20 g of the particles resulting from example 3a) were suspended in 550 mL water by means of an ULTRA-TURRAX® and a solution of 14.84 g platinum nitrate in 214 mL water was added. Under agitation, a mixture of 471 mL ethanol and 650 mL water was added to the suspension and the suspension was heated to 82° C. After six hours at 82° C., the suspension was cooled to room temperature and filtrated. The solid residue was washed with 3 L water and dried in a vacuum oven at 80° C.

3c) Heat Treatment at 550° C.

The resulting solid from example 3b) was heat treated in a rotary tube furnace. In a nitrogen atmosphere, the temperature was raised to 400° C. by 5 Kelvin per minute. Under an argon stream comprising 4% by volume hydrogen, the temperature was further raised to 550° C. by 20 Kelvin per minute. When a temperature of 550° C. was reached, this temperature was kept constant for 10 minutes. Subsequently, the interior of the furnace was cooled to room temperature and for temperatures lower than 50° C., the hydrogen comprising stream was switched to a nitrogen stream without hydrogen. Then, the heat treated particles were passivated for 12 hours in a gas stream consisting of 9% by volume air and 91% by volume nitrogen to form a carbon supported catalyst.

An elementary analysis of the carbon supported catalyst produced according to example 3 showed a niobium content of 16% by weight and a platinum content of 35% by weight.

Figure 11:
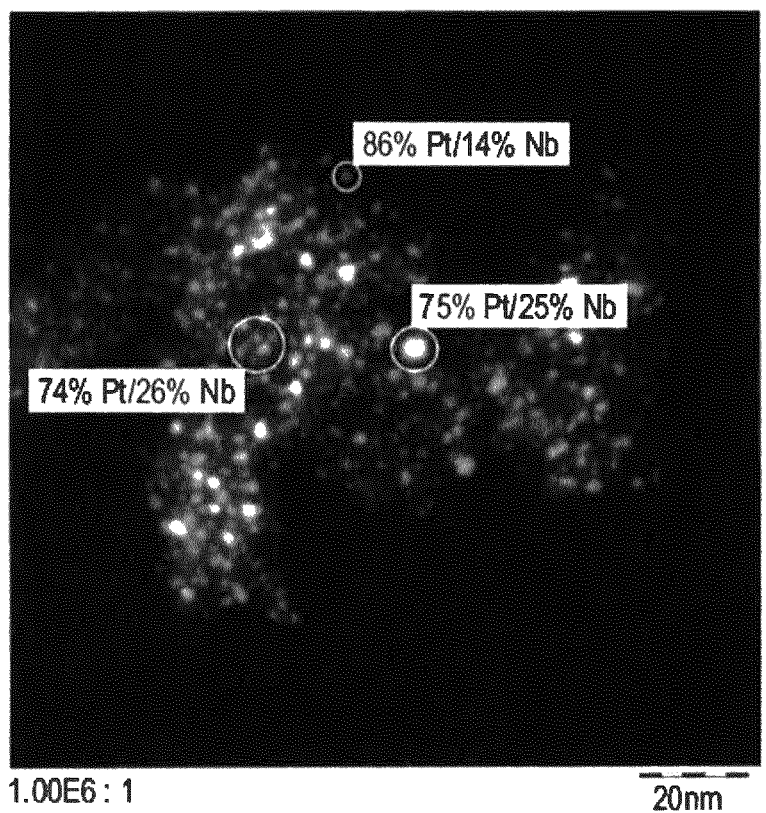
FIGS. 11 and 12 show TEM pictures of the carbon supported catalyst produced in example 3.
Figure 12:
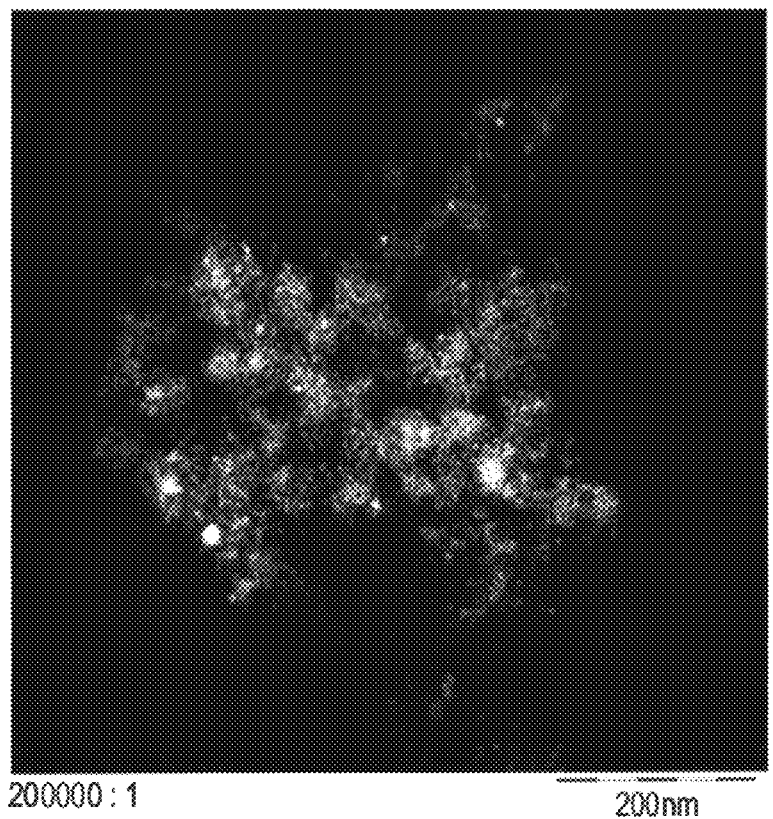

FIGS. 11 and 12 show TEM pictures of the carbon supported catalyst produced in example 3. The elements platinum and niobium were uniformly distributed, which led to a pronounced stabilizing effect. The data given in % by weight in FIG. 11 resulted from a local EDX-analysis of niobium and platinum.

Figure 13:
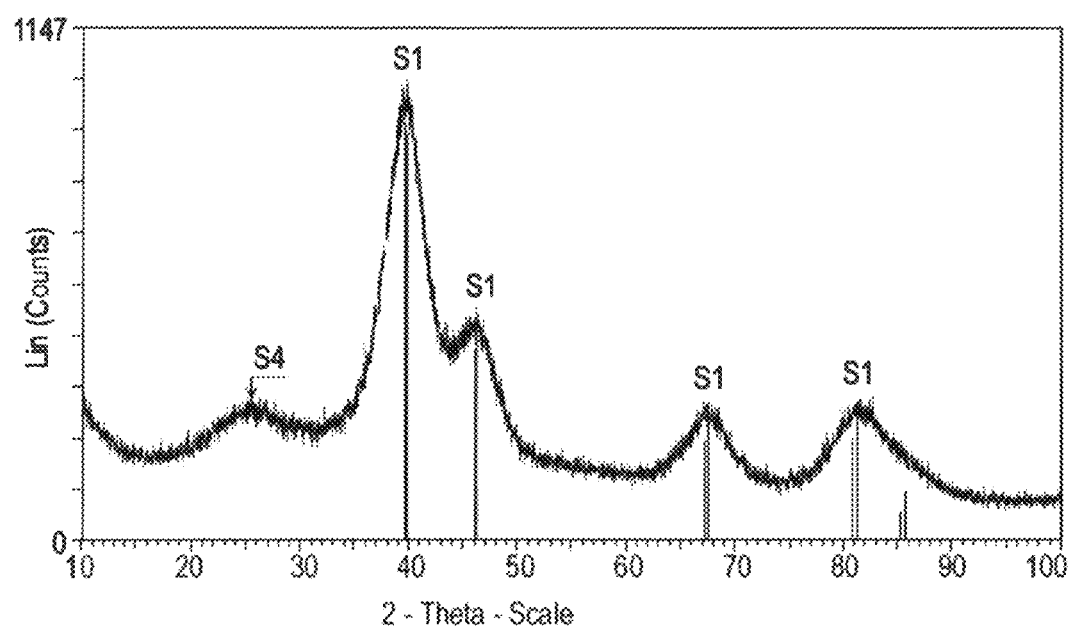
FIG. 13 shows an X-ray diffractogram of the carbon supported catalyst produced in example 3.

FIG. 13 shows an X-ray diffractogram of the carbon supported catalyst produced in example 3. The reflexes shown in FIG. 13 originate from the analysis of the sample produced in example 3. The bars represent reference reflexes, wherein S1 corresponds to a cubic platinum phase and/or a cubic $Nb_{0.2}Pt_{0.8}$ phase, S2 corresponds to an orthorhombic $Nb_2O_5$ phase, S3 corresponds to a tetragonal $NbO_2$ phase and S4 corresponds to crystalline carbon present as graphite in the carbon support. It can be read from FIG. 13 that as crystalline phase only platinum and/or the intermetallic phase or alloy comprising platinum and niobium was identified. Therefore, niobium oxide is present in an amorphous state in the carbon supported catalyst produced in example 3.

II. Comparative Production Examples

Comparative Example 1

C1a) Deposition and Reduction of Platinum Nitrate on Untreated Carbon 3.5 g carbon (Black Pearls® 2000, Cabot) were suspended in 500 mL water by means of an ULTRA-TURRAX® and a solution of 2.60 g platinum nitrate and 100 mL water was added. Under agitation, a mixture of 210 mL ethanol and 40 mL water was added to the suspension and the suspension was heated to 82° C. under reflux. After six hours at 82° C., the suspension was cooled to room temperature and filtrated. The solid residue was washed with 2.5 L water and dried in a vacuum oven at 80° C.

C1b) Heat Treatment at 550° C.

The particles resulting from example C1a) were heat treated in a rotary tube furnace. In a nitrogen atmosphere, the temperature was raised to 400° C. by 5 Kelvin per minute. Under an argon stream comprising 4% by volume hydrogen, the temperature was further raised to 550° C. by 20 Kelvin per minute. When the temperature of 550° C. was reached, this temperature was kept constant for 10 minutes. Then, the interior of the furnace was cooled to room temperature and at temperatures lower than 50° C., the hydrogen comprising stream was switched to a nitrogen stream without hydrogen. Then, the heat treated particles were passivated for 12 hours in a gas stream consisting of 9% by volume air and 91% by volume nitrogen.

An elementary analysis of the carbon supported catalyst produced in comparative example 1 showed a platinum content of 21% by weight.

Comparative Example 2

C2a) Deposition and Reduction of Platinum Nitrate on Untreated Carbon 20 g carbon (Black Pearls® 2000, Cabot) were suspended in 550 mL water by means of an ULTRA-TURRAX® and a solution of 14.6 g platinum nitrate and 215 mL water was added. Under agitation, a mixture of 471 mL ethanol and 650 mL water was added to the suspension and the suspension was heated to 82° C. under reflux. After six hours at 82° C., the suspension was cooled to room temperature and filtrated. The solid residue was washed with 5 L water and dried in a vacuum oven at 80° C.

C2b) Heat Treatment at 800° C.

The particles resulting from example C2a) were heat treated in a rotary tube furnace. After purging with nitrogen, a flow of nitrogen comprising 5% by volume of hydrogen was applied. The temperature was raised to by 10 Kelvin per minute to 800° C. When the temperature of 800° C. was reached, the temperature was kept constant for one hour. Then, the interior of the furnace was cooled to room temperature and at temperatures lower than 50° C., the hydrogen comprising stream was switched to a nitrogen stream without hydrogen. Then, the heat treated particles were passivated for 12 hours with a gas stream consisting of 9% by volume air and 91% by volume nitrogen.

An elementary analysis of the carbon supported catalyst produced in comparative example 2 showed a platinum content of 28% by weight.

Comparative Example 3

C3a) Precipitation of Niobium Oxide onto Carbon by Slow Removal of the Solvent 3.6 g carbon (Black Pearls® 2000, Cabot) were suspended in a mixture of 72 mL acetic acid and 180 mL 2-propanol. This mixture C1 was treated by ultrasound for 20 minutes. 4.95 mL niobium ethanolate were dissolved under nitrogen atmosphere in a mixture C2 of 142 mL acetic acid and 360 mL 2-propanol. The mixture C2 was treated by ultrasound for 20 minutes. Mixtures C1 and C2 were united and treated by ultrasound for 30 minutes. Under continued ultrasound treatment, a nitrogen stream was led over the surface of the united mixtures C1 and C2. After 24 hours, the solvent was removed.

C3b) Deposition and Reduction of Platinum Nitrate

The particles obtained in example C3a) were suspended in 180 mL water by means of an ULTRA-TURRAX® and a solution of 4.6 g platinum nitrate in 87 mL water was added. Under agitation, a mixture of 146 mL ethanol and 173 mL water was added and the suspension was heated to 82° C. under reflux. After six hours at 82° C., the suspension was cooled to room temperature and filtered. The solid residue was washed with 2.5 L water and dried in a vacuum oven at 80° C.

C3c) Heat Treatment at 550° C.

The particles resulting from example C3b) were heat treated in a rotary tube furnace. Under nitrogen atmosphere, the temperature was raised to 400° C. by 5 Kelvin per minute. Under a an argon stream comprising 4% by volume hydrogen, the temperature was further raised to 550° C. by 20 Kelvin per minute. When a temperature of 550° C. was reached, this temperature was kept constant for 10 minutes. Then, the interior of the furnace was cooled to room temperature and for temperatures lower than 50° C., the hydrogen comprising stream was switched to a nitrogen stream without hydrogen. The heat treated particles were passivated for 12 hours in a gas stream consisting of 9% by volume of air and 91% by volume of nitrogen.

An elementary analysis of the carbon supported catalyst produced in comparative example 3 showed a niobium content of 15% by weight and a platinum content of 32% by weight.

Figure 14:
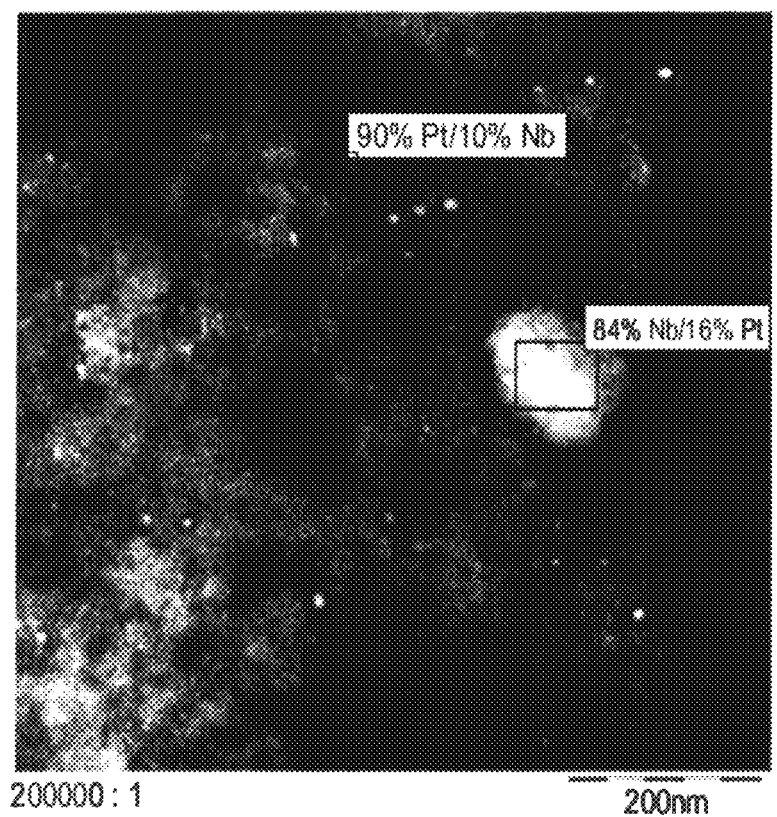
FIGS. 14 and 15 show TEM pictures of the carbon supported catalyst produced in comparative example 3.
Figure 15:
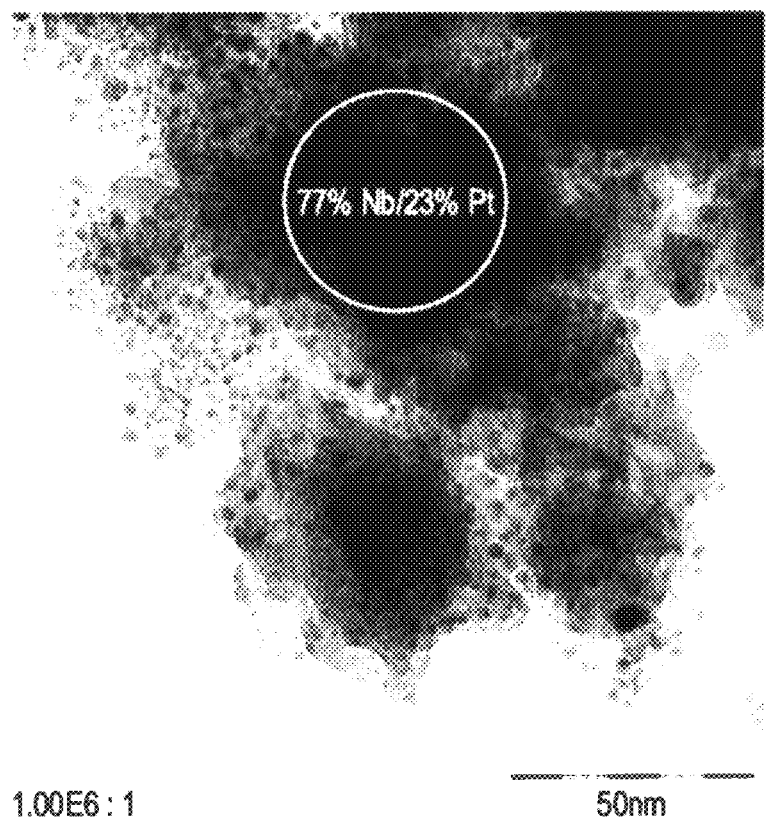
Figure 16:
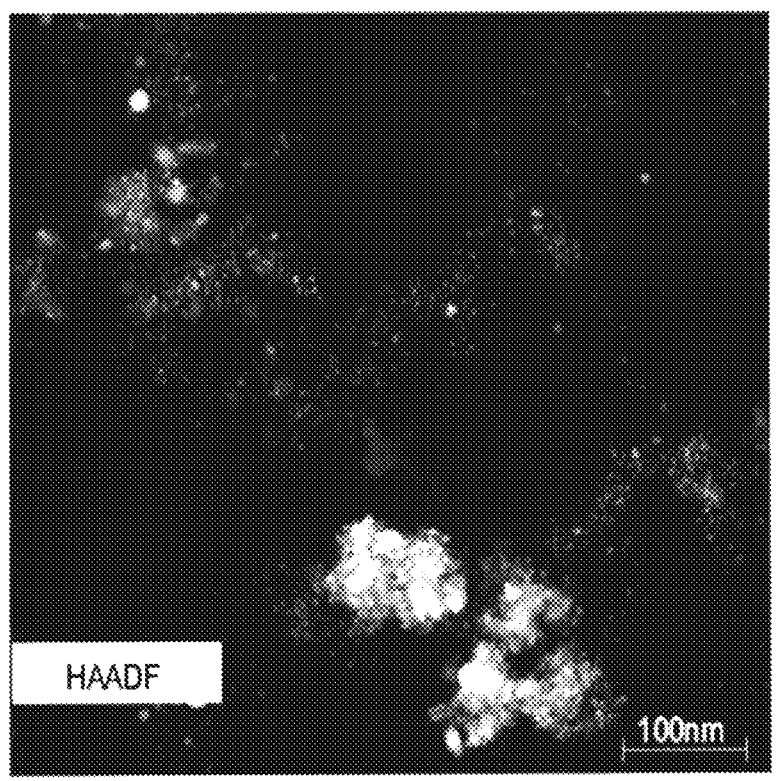
FIGS. 16, 17, 18 and 19 show high resolution TEM/EDX-pictures of the carbon supporte catalyst produced in comparative example 4.
Figure 17:
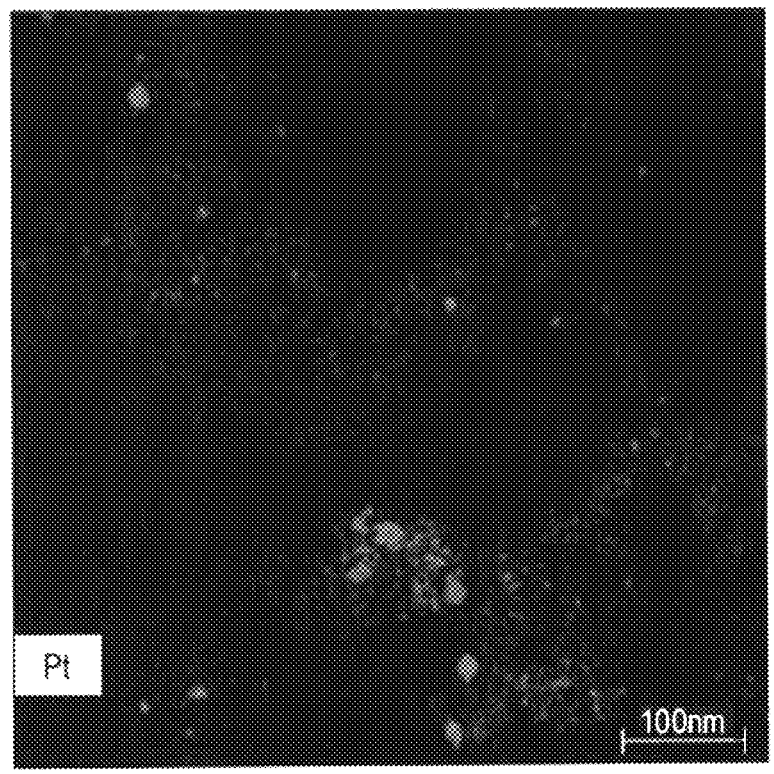
Figure 18:
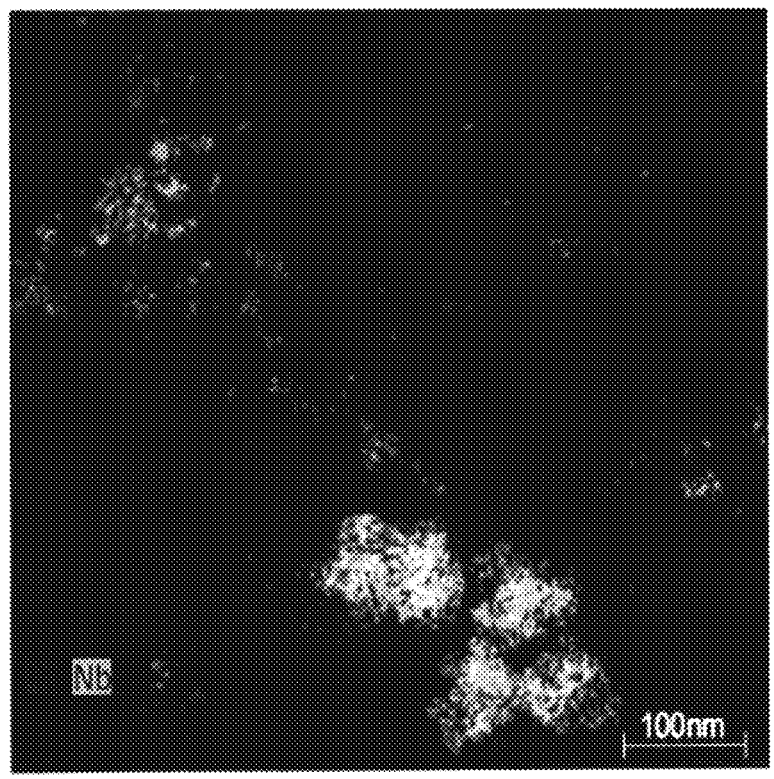
Figure 19:
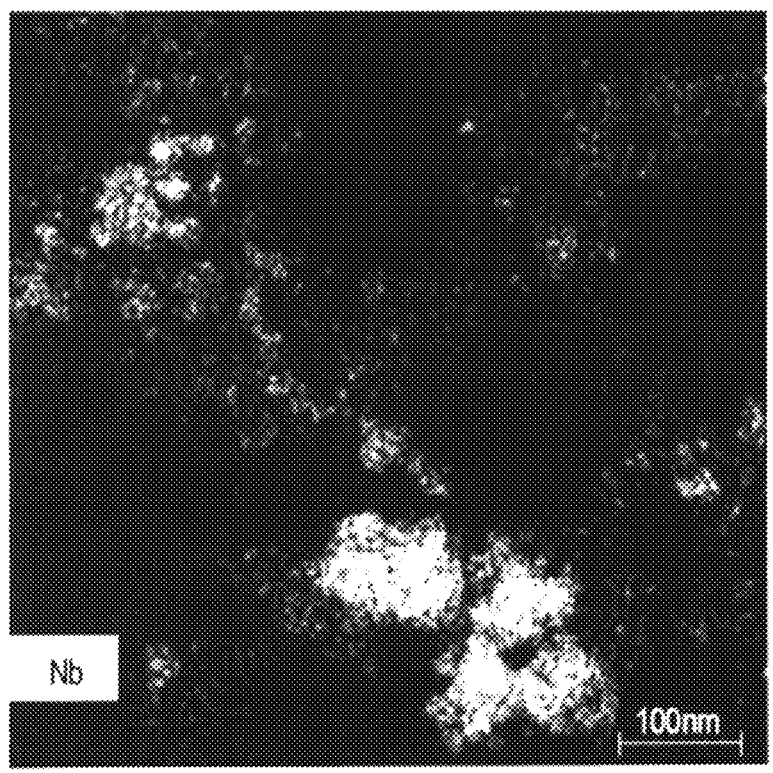

FIGS. 14 and 15 show TEM pictures of the carbon supported catalyst produced in comparative example 3. The distribution of the elements niobium and platinum was considerably less uniform in comparison to the TEM pictures of the carbon supported catalyst produced in examples 1, 2 and 3, respectively (compare FIGS. 4, 5, 7, 8, 11 and 12).

The comparative example 3 shows that a slow removal of the solvent in the precipitation step of the niobium oxide led to a non-uniform distribution of the niobium oxide on the surface of the carbon-comprising support in comparison to a spray-dried intermediate product.

Comparative Example 4

C4a) Precipitation of Niobium Oxide, Slow Removal of the Solvent

A mixture of 16 mL acetic acid and 90 mL 2-propanol was prepared. One third of this mixture was mixed with 4 g carbon (Black Pearls® 2000, Cabot) resulting in a mixture C3. The remaining two thirds of the acetic acid/2-propanol mixture was mixed with 68.86 g niobium ethanolate resulting in a mixture C4. Mixtures C3 and C4 were mixed. The solvent was removed within 8 hours in a rotary evaporator at 30° C. under atmospheric pressure and nitrogen atmosphere. The resulting particles were heated to 400° C. in a rotary tube furnace in a nitrogen atmosphere by 3.2 Kelvin per minute. The temperature of 400° C. was kept constant for one hour. Then, the interior of the furnace was cooled to room temperature.

C4b) Loading with Platinum 3.46 g platinum(II)acetylacetonate were dissolved in 1 L ethanol. 100 mL of this solution were mixed with 4 g of the particles produced in example C4a). The resulting suspension was treated with an ULTRA-TURRAX® for 10 minutes. Then, the remaining 900 mL of the platinum(II) acetylacetonate/ethanol mixture were added and mixed with the suspension. The solvent was removed within 28 hours in a rotary evaporator at 30° C. under atmospheric pressure and a stream of nitrogen.

C43c) Heat Treatment at 800° C.

The particles produced in step C4b) were heat treated in a rotary tube furnace. The furnace was flushed with nitrogen for five minutes. Then, the temperature was raised to 800° C. by 10 Kelvin per minute in an atmosphere comprising 4% by volume hydrogen in nitrogen. The temperature of 800° C. was kept constant for one hour. Then, the interior of the furnace was cooled to room temperature and for temperatures below 50° C., the hydrogen comprising stream was switched to nitrogen without hydrogen. The heat treated particles were passivated for 12 hours in a gas stream consisting of 9% by volume air and 91% by volume nitrogen.

An elementary analysis of the carbon supported catalyst produced in comparative example 4 showed a niobium content of 23.1% by weight and a platinum content of 20.8% by weight.

FIGS. 16, 17, 18 and 19 show high resolution TEM/EDX-pictures of the carbon supported catalyst produced in comparative example 4. The local distribution of the elements platinum and niobium can be seen in the FIGS. 16, 17, 18 and 19. In comparison with examples 1, 2 and 3, a less uniform distribution of the element niobium was obtained. Platinum is preferably deposited in the areas, which are rich in niobium.

III. Electrochemical Testing of Carbon Supported Catalysts

The carbon supported catalysts resulting from examples 2 and 3 and comparative examples 2, 3 and 4 were tested in the oxygen reduction reaction (ORR) on a rotating disk electrode (RDE) at room temperature. The setup comprised three electrodes. As counter electrode a platinum foil and as reference electrode an Hg/HgSO$_4$ electrode were installed. The noted potentials refer to a reversible hydrogen electrode (RHE). An ink, comprising the carbon supported catalyst, was prepared by dispersing approximately 0.01 g carbon supported catalyst in a solution, consisting of 4.7 g demineralized ultra-pure water with a conductivity of less than 0.055 µS/cm, 0.04 g of a solution of 5% by weight of Nafion®, which is a perfluorinated resin solution, commercially available from Sigma-Aldrich Corp., comprising 80% to 85% by weight of lower aliphatic alcohols and 20% to 25% by weight of water, and 1.2 g of 2-propanol. The ink was treated by ultra-sonication for 15 minutes.

7.5 µL of the ink were pipetted on a glassy carbon electrode with a diameter of 5 mm. The ink was dried without rotation of the electrode in a flow of nitrogen. As electrolyte a 0.1 M solution of HClO$_4$ was applied, which was saturated with argon.

Initially, cleaning cycles and cyclovoltamograms for background subtraction (Ar-CV) were applied. These steps are further defined as steps 1 and 2 in table 1.

Subsequently, the electrolyte was saturated with oxygen and the oxygen reduction activity was determined (step 3, table 1).

Thereafter, an accelerated degradation test was applied in argon-saturated electrolyte. Therefore, the potential was changed according to square wave cycles (step 5, table 1).

Subsequently, the electrolyte was exchanged against a fresh 0.1 M HClO$_4$ solution and the steps of cleaning and Ar-CV in argon-saturated electrolyte were repeated (steps 6 and 7 in table 1) and the oxygen reduction (ORR) activity was measured again in oxygen saturated electrolyte (step 8 in table 1).

The electrochemical performance of the different carbon supported catalysts is expressed by the comparison between the ORR activities before (step 3) and after (step 8) the degradation tests (step 5).

From the anodic part of the third ORR-CV the Ar-CV from the prior step was subtracted, in order to remove the background currents. The platinum-mass-related kinetic activity $I_{kin}$ was calculated by taking into account the current at 0.9 V ($I_{0.9V}$), the limiting current at approximately 0.25 V ($I_{lim}$) and the mass of platinum on the electrode ($m_{Pt}$):

$$I_{kin} = I_{0.9V} \cdot I_{lim}/(I_{lim} - I_{0.9V})/m_{Pt}$$

The assumptions made for this calculation method and further details thereof are described in Paulus et al., in Journal of Electroanalytical Chemistry, 495 (2001), pages 134 to 145.

TABLE 2

Stability of the carbon supported catalysts

| | ORR activity/mA/mg$_{Pt}$ | |
| --- | --- | --- |
| | fresh catalyst (step 3) | after degradation (step 8) |
| Example 2 | 232 | 235 |
| Example 3 | 221 | 230 |
| Comparative Example 2 | 274 | 170 |
| Comparative Example 3 | 245 | 201 |
| Comparative Example 4 | 131 | 185 |

The amount of platinum required for a certain performance in applications for example in fuel cells strongly depends on the stability of the carbon supported catalyst as well as on the initial activity of the fresh carbon supported catalyst. The residual activity of the used carbon supported catalyst after degradation test is a crucial parameter, mimicking the degradation of the catalytically active metal phase in a real fuel cell to a large extent.

The catalysts according to the invention being modified with niobium oxide and prepared in examples 2 and 3 showed with 235 and 230 mA/mg$_{Pt}$ the highest residual activity after degradation in comparison with the comparative examples 2, 3 and 4. Both inventive catalysts of examples 2 and 3 showed a higher stability against electrochemical degradation with higher residual activities after degradation in comparison with catalysts without niobium oxide or with catalysts prepared via other methods.

The invention claimed is:

1. A process for the production of a carbon supported catalyst, which comprises the following steps:
   (a) precipitation of at least one metal oxide onto a surface of a carbon-comprising support by preparing an initial

TABLE 1

Examination steps

| Step No. | Type | Saturation gas | Rotation rate | No of cycles | Potential range | Scan rate or hold time |
| --- | --- | --- | --- | --- | --- | --- |
| 1 | Cleaning | Argon | 0 rpm | 5 | 50-1400 mV | 1000 mV/s |
| 2 | Ar-CV | Argon | 0 rpm | 3 | 10-1000 mV | 20 mV/s |
| 3 | ORR-CV | Oxygen | 1600 rpm | 3 | 10-1000 mV | 20 mV/s |
| 4 | Ar-CV | Argon | 0 rpm | 3 | 10-1000 mV | 20 mV/s |
| 5 | Degradation | Argon | 0 rpm | 20,000 | 100-1000 mV | 0.5 s/0.5 s |
| 6 | Cleaning | Argon | 0 rpm | 5 | 50-1400 mV | 1000 mV/s |
| 7 | Ar-CV | Argon | 0 rpm | 3 | 10-1000 mV | 20 mV/s |
| 8 | ORR-CV | Oxygen | 1600 rpm | 3 | 10-1000 mV | 20 mV/s | mixture, comprising the carbon-comprising support, at least one metal oxide precursor and an organic solvent, and spray-drying of the initial mixture to obtain an intermediate product,
(b) loading of noble-metal-comprising particles onto the surface of the intermediate product in a liquid medium by deposition, precipitation and/or reduction of a noble-metal-comprising precursor with a reducing agent,
(c) heat treating the catalyst precursor resulting from step (b) at a temperature higher than 400° C.,
wherein the spray-drying is carried out with a drying gas at a temperature between 60° C. and 300° C.

2. The process according to claim 1, wherein the at least one metal oxide precursor comprises niobium, titanium, tantalum, molybdenum, vanadium, tungsten, cerium, zirconium, tin, silicon, or mixtures thereof and the metal oxide precursor is an alcoholate or a halide.

3. The process according to claim 1, wherein the metal oxide precursor is an alcoholate selected from the group consisting of ethanolate, n-propanolate, iso-propanolate, n-butanolate, iso-butanolate and tert-butanolate, or the metal oxide precursor is a chloride.

4. The process according to claim 1, wherein the organic solvent is an alcohol, a carboxylate ester, acetone or tetrahydrofuran.

5. The process according to claim 1, wherein the initial mixture comprises less than 2% by weight of water.

6. The process according to claim 1, wherein the initial mixture comprises up to 20% by weight of water.

7. The process according to claim 1, wherein the carbon-comprising support has a BET surface area of at least 500m$^2$/g.

8. The process according to claim 1, wherein the carbon-comprising support comprises carbon black, graphene, graphite, activated carbon or carbon nanotubes.

9. The process according to claim 1, wherein the loaded noble-metal-comprising particles comprise platinum and optionally cobalt, nickel, chromium, copper, palladium, gold, ruthenium, scandium, yttrium, lanthanum, niobium or titanium.

10. A carbon supported catalyst produced according to claim 9, wherein the carbon supported catalyst comprises between 2% by weight and 25% by weight of niobium oxide, a mass ratio of niobium comprised in the carbon supported catalyst and platinum comprised in the carbon supported catalyst is between 0.05 and 0.5, and at least 90% by number of platinum comprising particles comprised in the carbon supported catalyst have a diameter smaller than 20 nm.

11. The process according to claim 1, wherein the spray-drying is operated with a residence time of less than 3 minutes.

12. The process according to claim 1, wherein the heat treatment in step (c) is carried out in a reducing atmosphere.

13. The process according to claim 12, wherein the reducing atmosphere comprises up to 5% by volume of hydrogen.

14. The process according to claim 1, wherein a molar ratio of metal comprised in the at least one metal oxide precursor and carbon comprised in the carbon-comprising support in the initial mixture is between 0.00005 and 0.01, a carbon content in the initial mixture is between 1% and 30% by weight and a molar ratio of metal, originating from the at least one metal oxide precursor and comprised in the intermediate product, and the noble-metal-comprising particles comprise platinum and the platinum comprised in the liquid medium is between 0.05 and 0.8.

15. A process for the production of a carbon supported catalyst, which comprises the following steps:
(a) precipitation of at least one metal oxide onto a surface of a carbon-comprising support by preparing an initial mixture, comprising the carbon-comprising support, at least one metal oxide precursor and an organic solvent, and spray-drying of the initial mixture to obtain an intermediate product,
(a) loading of noble-metal-comprising particles onto the surface of the intermediate product in a liquid medium by deposition, precipitation and/or reduction of a noble-metal-comprising precursor with a reducing agent,
(b) heat treating the catalyst precursor resulting from step (b) at a temperature higher than 400° C.
wherein the spray-drying is carried out in a countercurrent mode.

16. A process for the production of a carbon supported catalyst, which comprises the following steps:
(c) precipitation of at least one metal oxide onto a surface of a carbon-comprising support by preparing an initial mixture, comprising the carbon-comprising support, at least one metal oxide precursor and an organic solvent, and spray-drying of the initial mixture to obtain an intermediate product,
(d) loading of noble-metal-comprising particles onto the surface of the intermediate product in a liquid medium by deposition, precipitation and/or reduction of a noble-metal-comprising precursor with a reducing agent,
(e) heat treating the catalyst precursor resulting from step (b) at a temperature higher than 400° C.,
wherein the spray-drying is carried out with an inert drying gas.

* * * * *